United States Patent [19]

Houston et al.

[11] 3,840,878

[45] Oct. 8, 1974

[54] DUAL MODE THERMAL RECORDER

[75] Inventors: David T. Houston; James S. Wilson, both of Houston, Tex.

[73] Assignee: Texas Instruments Incorporated, Dallas, Tex.

[22] Filed: Aug. 16, 1973

[21] Appl. No.: 388,856

Related U.S. Application Data

[63] Continuation of Ser. No. 212,516, Nov. 27, 1971, abandoned.

[52] U.S. Cl. ................................ 346/62, 346/76 R

[51] Int. Cl. ........................ G01d 9/34, G01d 15/10

[58] Field of Search ......... 346/76 R, 50, 62, 66, 67, 346/34

[56] References Cited

UNITED STATES PATENTS

| | | | |
|---|---|---|---|
| 3,085,132 | 4/1963 | Innes | 178/30 |
| 3,163,489 | 12/1964 | Borne et al. | 346/76 R |
| 3,453,647 | 7/1969 | Bernstein et al. | 346/76 R |
| 3,632,969 | 1/1972 | Walkow | 346/76 R |

*Primary Examiner*—Joseph W. Hartary
*Attorney, Agent, or Firm*—Harold Levin; Rene Grossman; Thomas G. Devine

[57] ABSTRACT

A recorder operates in one of two modes to record a graph and character on graph paper. The printing mechanism consists of individually energizable thermal printing elements in a thermal element matrix.

5 Claims, 4 Drawing Figures

DUAL MODE THERMAL RECORDER

This is a continuation of application Ser. No. 212,516, filed Dec. 27, 1971, now abandoned.

This invention is directed to a dual mode computer controlled recorder of digital processes.

Digital process recorders for recording analog information plotted in the form of a graphic presentation are widely used in automated factory systems and scientific instrumentation systems. Another type of recorder widely used in factory systems and scientific instrumentation systems are alpha-numeric printout recorders which print out alpha and numeric information as a data recorder.

A user who wanted both a data readout terminal and a data plotter needed to purchase and have on line two separate devices, one for data plotting and one for data readout. Also, the data plotter did not normally provide provision for annotating the graphs recorded by a data plotter.

It is therefore an object of this invention to provide a new and improved data plotter.

Another object of this invention is to provide a data plotter having capability of annotating the graphic presentation of the data plotter.

Another object of this invention is to provide a dual mode recorder having capabilities for data plotting and data readout.

Accordingly, a new and improved dual mode computer controlled recorder of digital processes is provided. The recorder may both record data plotting of analog information in the form of a graphic presentation, annotate the graphs of the analog information, and also record data in alpha-numeric form.

For a more complete understanding of the present invention and for further objects and advantages thereof, reference may now be made to the following description taken in conjunction with the accompanying drawings in which:

Figure 1:
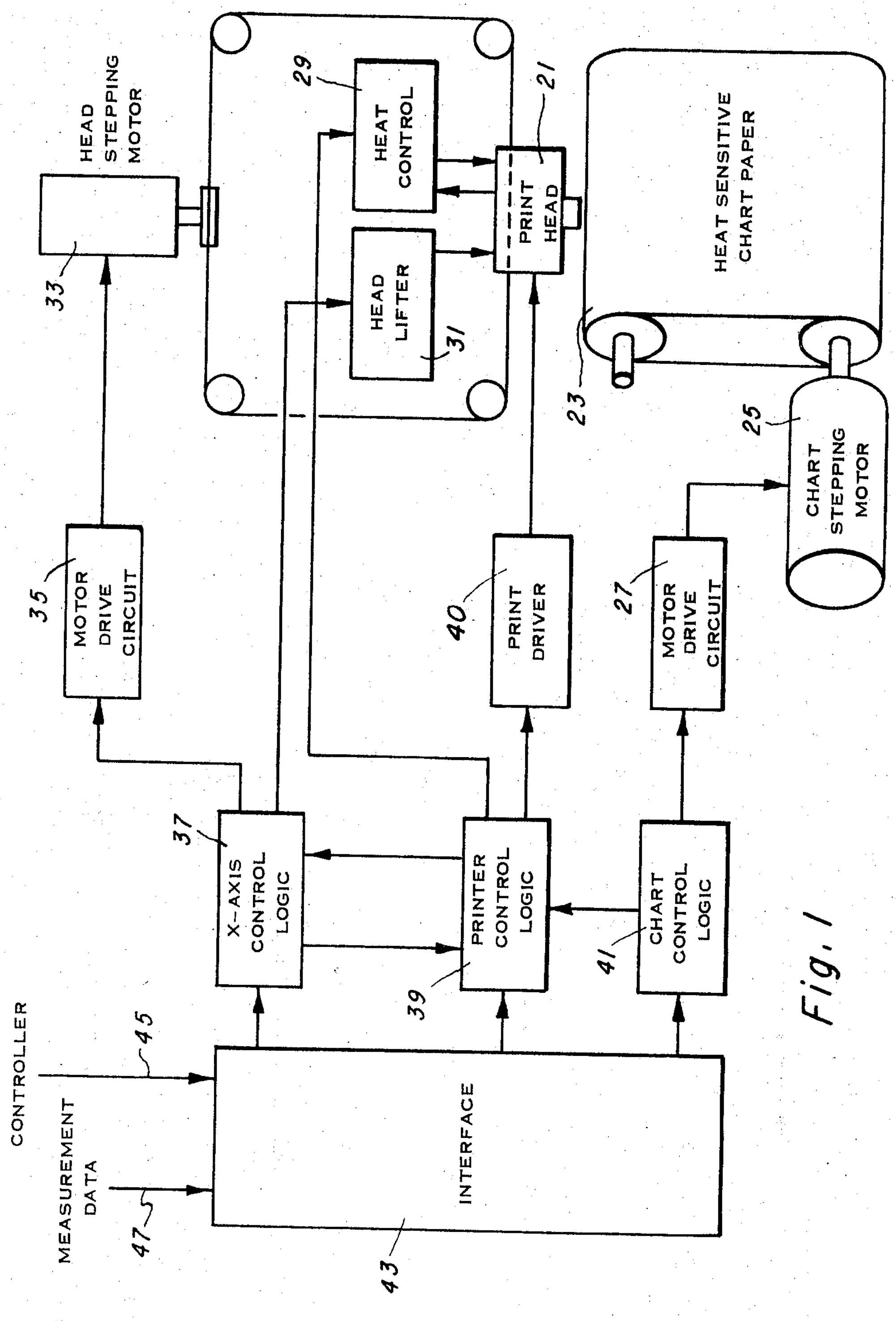
FIG. 1 is a block diagram of the dual mode recorder.

Referring now to FIG. 1, a thermal printhead 21 prints on the heat sensitive chart paper 23. A chart stepping motor 25 moves the heat sensitive chart paper in response to the motor drive circuit 27. The thermal temperature of printhead 21 is controlled by a heat control 29 and the head 21 is lifted by the head lifter 31 when it is moving between printing positions and is released so that the printing head 21 is in contact with the heat sensitive chart paper 23 at the printing positions. A head stepping motor 33 is driven by motor drive circuit 35 in response to X-axis control logic 37. The printer control logic 39 controls the print driver 40, and contains the character generator and the dot selection logic. The chart control logic 41 controls the motor drive circuit 27. There is an interface unit 43 between a computer and the recorder logic. The controller input to the interface unit 43 is on line 45 and the measurement data input is on line 47. The controller is a typical, well known device for receiving signals in electronic bi-level digital format from a digital computer for appropriate coding and function transmission to peripheral equipment. The digital signals activate appropriate circuits in the controller to operate electric motors, pumps, etc. In this particular application, a command source, such as a digital computer, sends digital signals on input lines selected to print a desired character or dot and further digitally signals whether a dot or a character is to be recorded. A controller designed to operate in conjunction with a particular peripheral device typically provides voltage levels and timing sequences appropriate for the particular peripheral device. Otherwise, an interface device 43 may be provided to match voltage levels. Also, there may be a need for a multiplexer to select one of a plurality of controllers and such a multiplexer can be considered as an interface. In summary, such interconnecting devices are well known in the prior art. The controller and the measurement data sources will not be further described.

Figure 2:
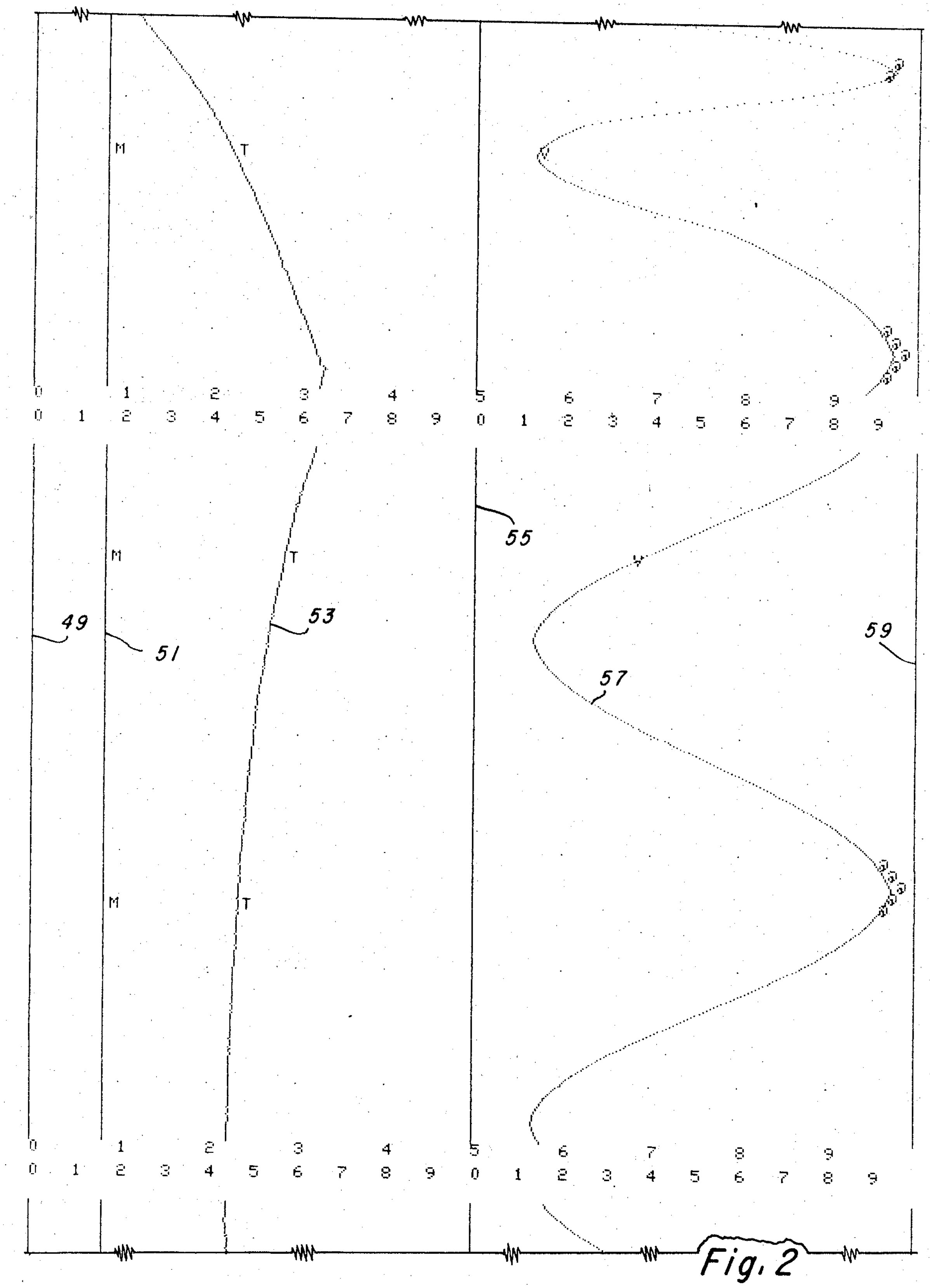
FIG. 2 shows a chart generated using the dual mode recorder.

Shown in FIG. 2 is a chart generated using this invention.

The thermal printhead 21 is of the type described in U.S. Pat. No. 3,496,333.

Printhead 21 consists of a five by seven matrix with 35 individually energizable thermal elements. The 35 elements may be energized to print a character on the thermally sensitive chart paper, or alternatively, may be energized in one of several different patterns to print on the heat sensitive chart paper a portion of a graph.

Referring now to FIG. 2, a chart is shown which has been generated by the dual mode energization of the thermal printhead 21.

The chart shown in FIG. 2 is generated by moving the printhead 21 horizontally across the chart paper and printing one dot at a time in traces 49, 51, 53, 55, 57 and 59. The printing of the dots is done a dot at a time in the first mode (graphic mode). The characters shown printed are printed a character at a time in the second mode (character mode) of operation in the recorder.

Thus, in trace 49 the first dot at the upper left hand corner of the chart is printed, then the printhead is indexed in the *x*-axis (horizontal axis) to the second trace 51 where a second dot is printed. The printhead is then indexed in the *x*-axis (horizontal axis) to trace 53 where another dot is printed, to trace 55 to print another dot, to trace 57 to print another dot, and to trace 59 to print the last dot. The printhead is then returned to the left side of the paper to a second dot in trace 49 and so forth across the page to print second dot in traces 51, 53, 55, 57 and 59. The dot printing continues in this operation printing a dot at a time as it moves across the page to come up with the complete traces 49, 51, 53, 55, 57 and 59 shown in FIG. 2. As the printhead moves across the paper it can shift to the second mode (character mode) to print a character; for instance, the character "M" is shown printed after trace 51, the character "T" is shown printed after trace 53, and other characters are shown printed on the paper.

In an alternative mode of operation it would be possible in printing a straight line trace, using a five by seven matrix, to have all of the thermal elements in one axis activated at one time and then indexed to continue on down the page. In the specific embodiment shown and described in this invention, only one thermal element in the printhead is energized at a single time.

In the graphic mode, the printhead is stepped in increments equal to the width of the five-by-seven dot matrix (0.08 inches) and the paper is stepped in increments equal to the height of the dot matrix (0.105 inches). By individual control of the 35 elements in the printhead matrix a dot or data point may be printed anywhere on the paper.

The recorder operates in the manner shown to generate a plurality of traces as shown in FIG. 2, using the recorder shown in block diagram form in FIG. 1.

The data input to the interface unit 43 selects in the printer control logic 39 the printing of a character in mode 2 or a dot in mode 1. As the data is read in, the printer control logic 39 through the *x*-axis control logic 37 steps the head along the paper to the desired position by the head stepping motor 33. The chart control logic 41 steps the chart paper 23 so that the characters and the dots may be printed in the proper position to come up with the traces and character shown in FIG. 2.

Figure 3:
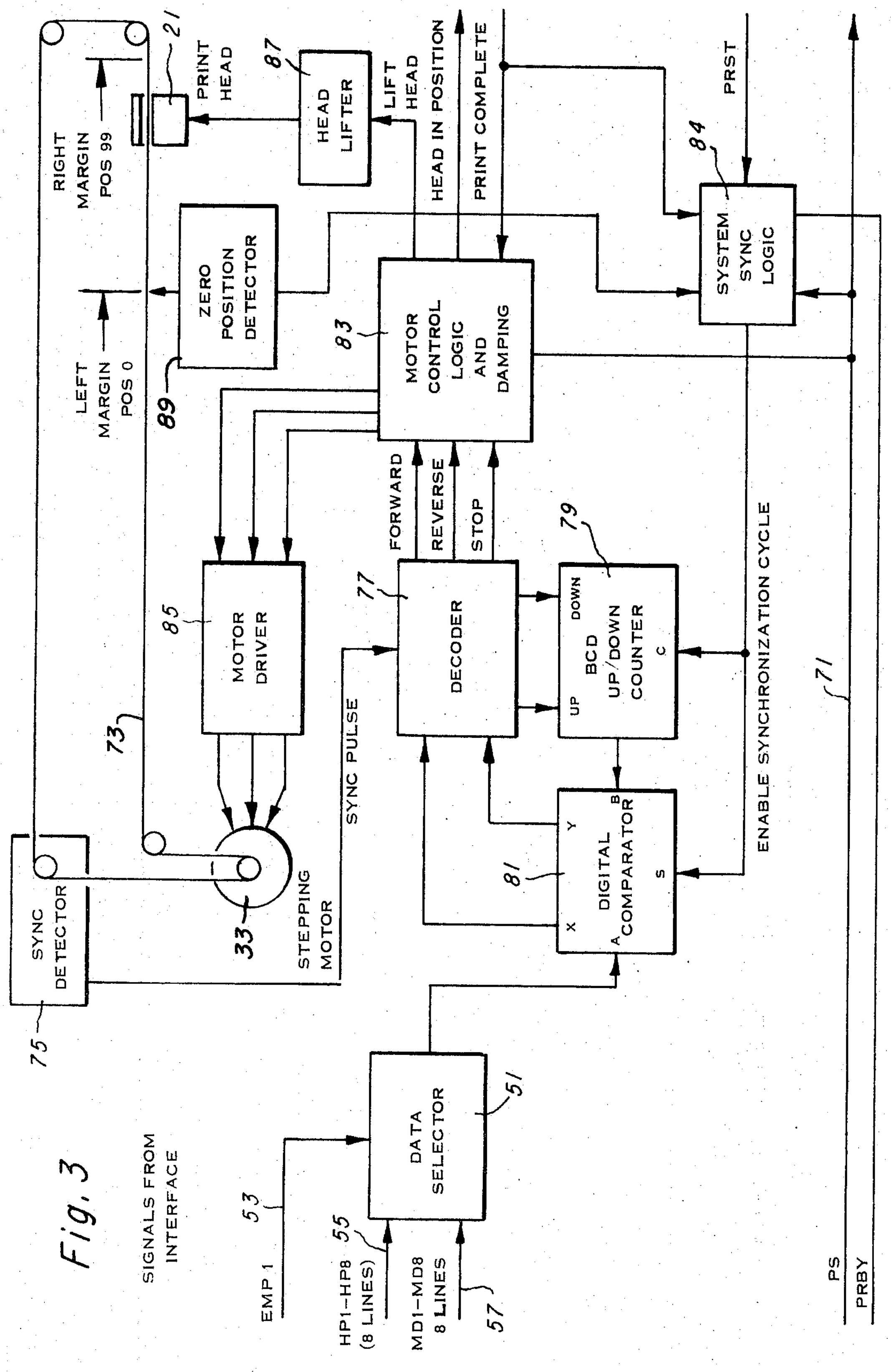
FIG. 3 shows a block diagram of the x-axis control logic.

Referring now to FIG. 3 for a block diagram of the x-axis control logic (shown as block 37 in FIG. 1) which includes sync detector 35, zero position detector 89, system sync logic 84, decoder 77, BCD up/down counter 79 and digital comparator 81. Data selector 51, included in printer control logic 39 of FIG. 1 is also shown. The motor drive circuit 35 of FIG. 1 is shown as motor control logic and damping 83 and motor driver 85. Motor driver 85 actually selects the phase for moving stepping motor 33. The data selector unit 51 receives an enable print input on input terminal 53 from the interface unit 43 in FIG. 1 telling the data selector 51 whether the recorder is in mode 1 or mode 2. There are two eight line inputs having eight bits applied to the data selector 51 with the eight bits for the mode 2 applied to the input terminals 55 and for mode 1 applied to the input terminals 57. An input is applied on input terminal 71 which is a print strobe to cause the print cycle to actually begin after the data is received from the interface unit 43 shown in FIG. 1. The printhead 21 moves between the left margin at position 0 to the right margin at position 99 so that there are 100 positions possible for the printhead. The printhead is positioned by stepping motor 33. A string cable 73 is connected to the stepping motor 33 and to the printhead 21 to move the printhead 21 between the left margin and the right margin at the possible 100 positions. A sync detector 75 is connected to the string cable 73 so that it provides a pulse every time that the printhead is moved from one position to another position and applies this pulse to decoder 77. Decoder 77 applies a pulse to the up down counter 79 to either add or subtract the count up or down depending upon whether the motor 33 is moving the printhead 21 forward or backward, thus the up down counter 79 always contains a representation of the position of the printhead 21 in relation to the left margin and the right margin of the chart paper 21. The programmed position indicated in the data selector 51 is applied to digital comparator 81 to compare the desired position for the printhead 21 with the actual position indicated in the up down counter 79. Dependent upon this comparison, the outputs for the digital comparator 81 are applied to the decoder 77 so that motor control logic 83 controls the motor driver 85 to move the stepping motor 33 forward, reverse or stop the motor where it is. After the motor has moved the printhead to the desired position the printing may be carried out.

The entire cycle as described has been started by the print strobe on input terminal 71. The motor control logic 83 will also apply a signal to the head lifter 31 to lift the printhead between times it is moved from one position to another position.

The System Sync Logic 84 is used to automatically synchronize to BCD up/down counter with actual printhead position whenever recorder power is turned on.

Figure 4:
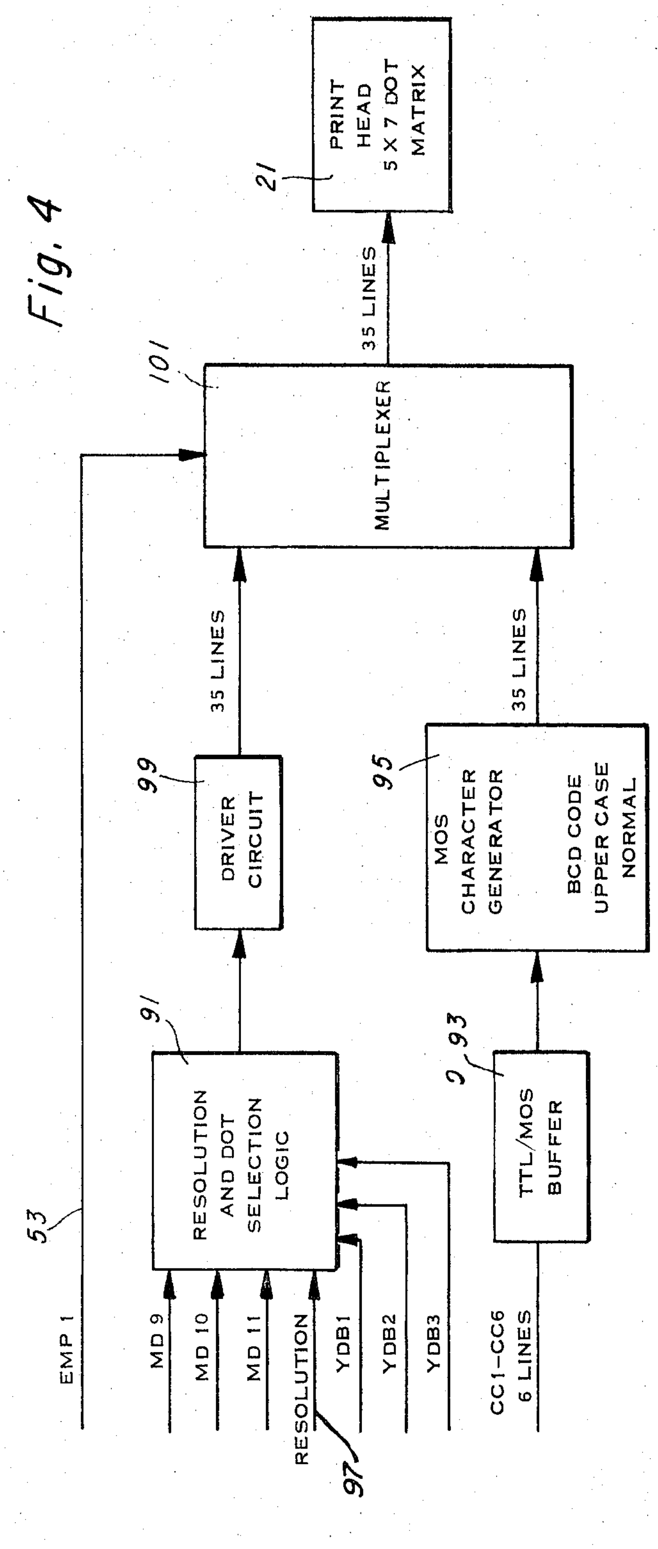
FIG. 4 shows the details of the data selector circuit.

Referring now to FIG. 4, the details of the data selector circuit 51 are shown.

The inputs to the printer control logic shown in FIG. 4 are applied so that the inputs for the dot selection are applied to the resolution and dot selection logic 91 while the input for the character selection is applied to input to the TTL/MOS buffer 93 and then to the MOS character generator 95. The resolution and dot selection logic 91 has applied to it on three input terminals MD9, MD10, and MD11 a code for selecting one out of the five columns of the printhead matrix while the inputs to the YDB1, YDB2 and YDB3 select one out of the seven rows of the five by seven matrix. In other words, by specifying the row and column of the printhead matrix, any one of the 35 thermal elements may be selected. The resolution input applied on input terminal 97 will select one dot or will select all 35 dots to be prined to use as a bar graph. When one dot is selected, the plotting resolution is 0.2 percent of full scale. When all 35 dots are selected simultaneously, the resolution is 1 percent of full scale.

The outputs from the resolution of dot selection logic 91, after the inputs have been decoded, are applied to the driver circuit 99, to the multiplexer unit 101. Multiplexer 101 is enabled by the input on input terminal EMP1 (53) determining whether the printing is to be done in a mode 1 or a mode 2 so that the data selector will select the output from either a dot (or from the resolution) of dot selection 91 to print a dot or the output from the MOS character generator 95 to print a character. The output from the multiplexer 101 is supplied directly to the printhead 21 to print the selected character or dot depending on the mode of printing.

We claim:

1. A chart recorder, for thermal recording on heat sensitive chart paper with a thermal element printhead matrix having individually energizable thermal elements, the matrix being selectively movable across the chart paper in an x-axis and the chart paper being selectively stepped in the y-axis when the x-axis has been traversed a desired distance to provide a successive space in the x-axis, the chart recorder having input means for receiving digital signals representative of the desired thermal elements to be energized and of the desired motion of the printhead matrix, comprising:

a. moving means, connected to the printhead matrix for moving the matrix in either direction in the x-axis between a left and a right margin;

b. motion control means, responsive to the digital signals representative of the desired motion, connected to the moving means, for causing the printhead matrix to move to a desired position between the left and right margins;

c. graph selection means, responsive to the digital signals representative of the desired thermal elements to be energized, connected to the printhead matrix for enabling the matrix to print a portion of a graph on the chart paper;

d. character selection means, responsive to the digital signals representative of the desired thermal elements to be energized, connected to the printhead matrix for enabling the printhead matrix to print a character on the chart paper; and e. enabling means, connected to the graph selection means and to the character selection means, for selectively enabling the graph selection means and the character selection means for printing an annotated graph of characters and graphs on the chart paper.

2. The chart recorder of claim 1 further comprising lifting means, connected to and responsive to the motion control means for lifting the printhead matrix when it is being moved along the x-axis between printing positions.

3. The recorder of claim 1 wherein the motion control means further comprise:

i. position indicating means, operatively connected to the moving means for indicating the position of the printhead matrix relative to the right and left margins;

ii. position selection means for selecting the *x*-axis position of the printhead matrix;

iii. comparison means, connected to the position selection means and to the position indicating means for comparing the desired position with the actual position; and iv. correction control means connected to the comparison means and responsive to the output of the comparison means for moving the printhead matrix when the desired position and actual position are different.

4. The chart recorder of claim 3 wherein the moving means further comprise a stepping motor.

5. The chart recorder of claim 4 wherein the position indicating means further comprise a sync detector operatively connected to the moving means for providing a pulse each time a predetermined distance is traversed and an up/down counter connected to the sync detector for counting the pulses provided by the sync detector.

* * * * *